United States Patent
Koch

(10) Patent No.: US 10,206,271 B2
(45) Date of Patent: Feb. 12, 2019

(54) OPERATING A BALLAST FOR A GAS DISCHARGE LAMP

(71) Applicant: OSRAM GmbH, Munich (DE)

(72) Inventor: Bernd Koch, Berlin (DE)

(73) Assignee: OSRAM GmbH, Munich (DE)

( * ) Notice: Subject to any disclaimer, the term of this patent is extended or adjusted under 35 U.S.C. 154(b) by 0 days.

(21) Appl. No.: 15/821,786

(22) Filed: Nov. 23, 2017

(65) Prior Publication Data
US 2018/0146534 A1    May 24, 2018

(30) Foreign Application Priority Data
Nov. 23, 2016 (DE) .......... 10 2016 223 153

(51) Int. Cl.
| | |
|---|---|
| *H05B 37/02* | (2006.01) |
| *H05B 41/36* | (2006.01) |
| *H01J 61/06* | (2006.01) |
| *H05B 41/38* | (2006.01) |
| *H01J 61/56* | (2006.01) |

(52) U.S. Cl.
CPC .......... *H05B 41/36* (2013.01); *H01J 61/06* (2013.01); *H01J 61/56* (2013.01); *H05B 41/38* (2013.01)

(58) Field of Classification Search
CPC .......... H05B 41/36; H01J 61/06; H01J 61/56
See application file for complete search history.

(56) References Cited

U.S. PATENT DOCUMENTS

2005/0225262 A1\* 10/2005 Lurkens ............ H05B 41/2923
                                                              315/291
2005/0248293 A1    11/2005 Garavini et al.
(Continued)

FOREIGN PATENT DOCUMENTS

| DE | 2652275 A1 | 5/1978 |
|---|---|---|
| DE | 10209631 A1 | 9/2003 |

(Continued)

OTHER PUBLICATIONS

German Search Report based on application No. 10 2016 223 1531 (8 pages) dated Jun. 28, 2017 (Reference Purpose Only).

*Primary Examiner* — Dedei K Hammond
*Assistant Examiner* — Raymond R Chai
(74) *Attorney, Agent, or Firm* — Viering Jentschura & Partner MBB

(57) ABSTRACT

A gas discharge lamp includes at least two electrodes arranged in a manner spaced apart with a spacing in a discharge vessel filled with gas. A method of operating a ballast includes applying electrical energy to the electrodes. The ballast provides an electrical electrode current including a ripple current being dependent on an operating frequency of converter. Operating frequency is dependent on a charging time period and a discharging time period for an electrical energy store of the converter. The operating frequency is chosen such that the ripple current in the region of an arc discharge brings about a resonant excitation of the gas, and providing a pause time period between the discharging time periods and the respectively succeeding charging time period, the time duration of which pause time period is chosen such that a sum formed from the time periods attains the period duration corresponding to the operating frequency.

18 Claims, 5 Drawing Sheets

(56) References Cited

U.S. PATENT DOCUMENTS

| | | | | |
|---|---|---|---|---|
| 2007/0114943 | A1* | 5/2007 | Hendrix | H05B 41/3928 |
| | | | | 315/59 |
| 2010/0246184 | A1 | 9/2010 | Quadri et al. | |
| 2011/0298383 | A1 | 12/2011 | Muehlschlegel | |
| 2014/0111999 | A1 | 4/2014 | Quadri et al. | |
| 2015/0054410 | A1* | 2/2015 | Sanders | H05B 33/0857 |
| | | | | 315/151 |

FOREIGN PATENT DOCUMENTS

| | | |
|---|---|---|
| DE | 102009009892 A1 | 9/2010 |
| EP | 0837620 A2 | 4/1998 |
| EP | 1594349 A1 | 11/2005 |
| WO | 03075618 A1 | 9/2003 |

* cited by examiner

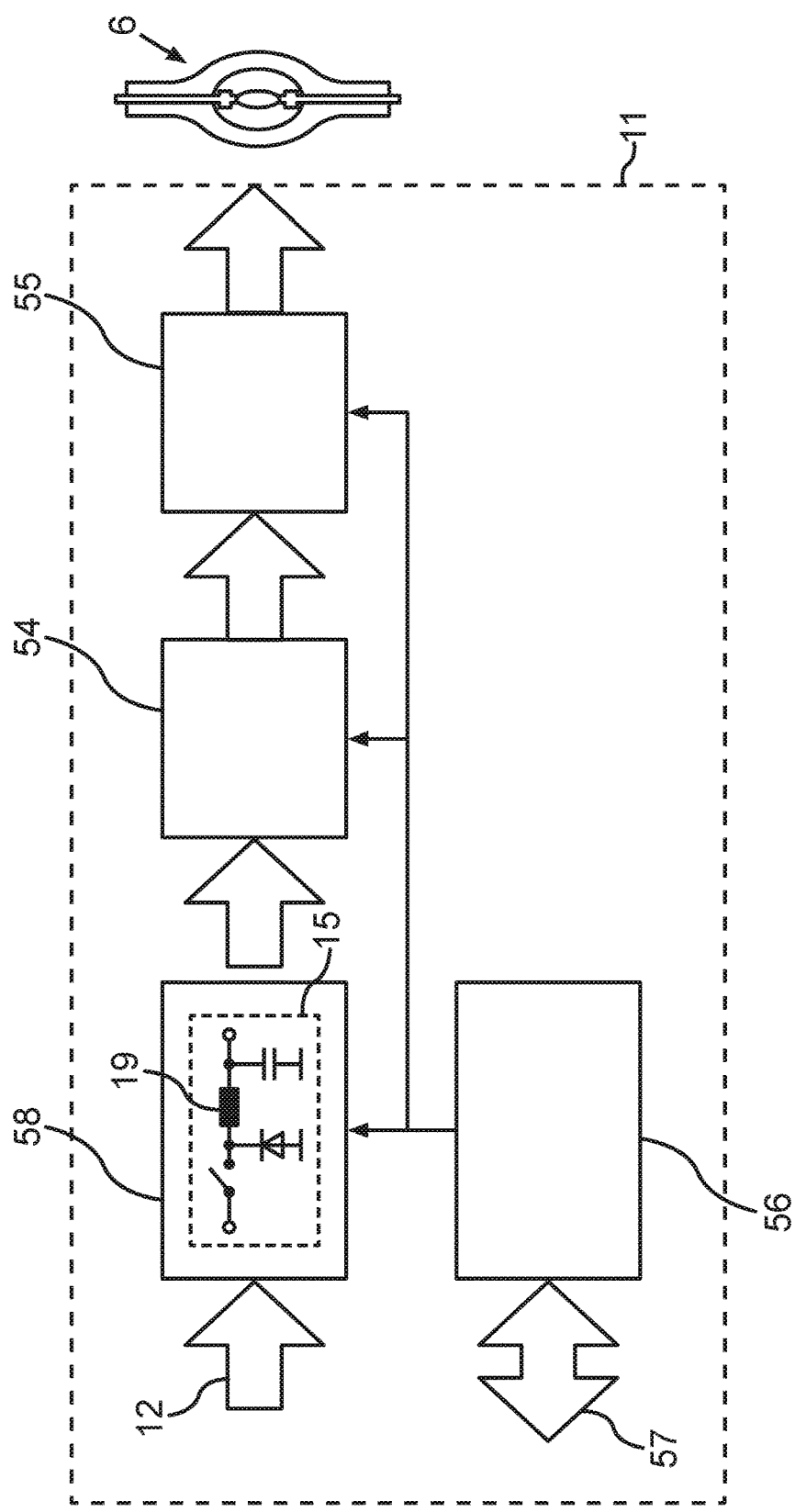

OPERATING A BALLAST FOR A GAS DISCHARGE LAMP

CROSS-REFERENCE TO RELATED APPLICATION

This application claims priority to German Patent Application Serial No. 10 2016 223 153.7, which was filed Nov. 23, 2016, and is incorporated herein by reference in its entirety.

TECHNICAL FIELD

Various embodiments relate generally to a method for operating a ballast for a gas discharge lamp having at least two electrodes arranged in a manner spaced apart with a predefined spacing in a transparent discharge vessel filled with a gas, wherein electrical energy is applied to the electrodes by means of the ballast in such a way that an arc discharge occurs between the electrodes, for which purpose the ballast provides a suitable electrical electrode current by means of a step-down converter of the ballast, said electrode current including a ripple current, wherein a ripple current frequency is dependent on an operating frequency of the step-down converter, wherein the operating frequency is dependent on a charging time period and a discharging time period for an electrical energy store of the step-down converter, wherein the operating frequency is chosen in such a way that the ripple current in the region of the arc discharge brings about a resonant excitation of the gas enclosed in the discharge vessel. Furthermore, various embodiments relate generally to a method for operating a ballast for a gas discharge lamp having at least two electrodes arranged in a manner spaced apart with a predefined spacing in a transparent discharge vessel filled with a gas, wherein electrical energy is applied to the electrodes by means of the ballast in such a way that an arc discharge occurs between the electrodes, for which purpose the ballast provides a suitable electrical electrode current, said electrode current including a ripple current, wherein a ripple current frequency is chosen in such a way that the ripple current in the region of the arc discharge brings about a resonant excitation of the gas enclosed in the discharge vessel. Furthermore, various embodiments relate generally to a ballast for a gas discharge lamp having at least two electrodes arranged in a manner spaced apart with a predefined spacing in a transparent discharge vessel filled with a gas, having a step-down converter for applying electrical energy to the electrodes, such that an arc discharge occurs between the electrodes, for which purpose the step-down converter is designed to provide a suitable electrical electrode current including a ripple current having a ripple current frequency dependent on an operating frequency of the step-down converter, which is dependent on a charging time period and a discharging time period for an electrical energy store of the step-down converter, wherein the step-down converter is furthermore designed to set the operating frequency in such a way that the ripple current in the region of the arc discharge brings about a resonant excitation of the gas enclosed in the discharge vessel. Furthermore, various embodiments relate generally to a ballast for a gas discharge lamp having at least two electrodes arranged in a manner spaced apart with a predefined spacing in a transparent discharge vessel filled with a gas, wherein the ballast is designed to apply electrical energy to the electrodes in such a way that an arc discharge occurs between the electrodes, for which purpose the ballast provides a suitable electrical electrode current including a ripple current, wherein a ripple current frequency is chosen in such a way that the ripple current in the region of the arc discharge brings about a resonant excitation of the gas enclosed in the discharge vessel. Finally, various embodiments relate generally to a luminaire having a gas discharge lamp having at least two electrodes arranged in a manner spaced apart with a predefined spacing in a transparent discharge vessel filled with a gas.

BACKGROUND

Luminaires having gas discharge lamps, ballasts for gas discharge lamps and methods for operating same are comprehensively known. A gas discharge lamp, occasionally also called gas discharge tube, discharge tube or the like, usually serves to provide light on the basis of electrical energy supplied. For this purpose, the gas discharge lamp includes at least the two electrodes arranged in a manner spaced apart with the predefined spacing in the transparent discharge vessel. The discharge vessel is generally hermetically sealed and filled with the gas. An electrical voltage is applied to the electrodes, such that an electric field forms between the electrodes.

For this purpose, an electrical potential can be applied to the electrodes from outside via electrical lines. The electrodes are usually connected to the ballast that applies the electrical voltage to the electrodes, such that the desired gas discharge for the purpose of generating light can be effected.

The discharge vessel is often formed from a ceramic material such as glass, in particular quartz glass, aluminum oxide ceramic or the like.

In general, the gas in the discharge vessel has a low pressure at room temperature when not in operation as intended.

The gas can be formed from a single gaseous substance or else by a gas mixture including a plurality of different gaseous substances. Furthermore, provision can also be made, of course, for the gas to evolve to its desired composition at a later point in time during operation on account of evaporation of a solid and/or a liquid within the discharge vessel. The gas need not have a constant composition. The gas composition can be dependent on a respective operating situation of the gas discharge lamp.

Certain properties of the discharge can be determined by means of the composition of the gas. Heat is liberated, inter alia, as a result of the gas discharge, said heat having the effect that a pressure in the discharge vessel increases. As gas it is possible to employ substances or substance mixtures such as, for example, metal vapors of sodium, rare earth metals, mercury and/or the like and also, if appropriate, with addition of halogens, for example in the manner of a metal-halide lamp or the like. Furthermore, also for promoting the ignition of a gas discharge lamp, a noble gas can be provided in the gas, for example xenon, krypton, neon or the like and also mixtures of halogens and further metals.

In order to generate high luminances, gas discharge lamps can be operated in the manner of high-pressure gas discharge lamps or else extra-high-pressure gas discharge lamps. Here the discharge is effected in the region of an arc that forms between the electrodes, such that an arc discharge is provided. High-pressure gas discharge lamps are available for example as mercury-vapor lamps, krypton arc lamps or the like. During operation as intended, a pressure of up to approximately 1 MPa can be present in the case of such gas discharge lamps. In the case of extra-high-pressure gas discharge lamps, such as, for example, the extra-high-pressure mercury-vapor lamp, the xenon short-arc lamp or the like, the pressure in the gas during operation as intended can even be up to approximately 10 MPa or even more, for example approximately 20 MPa or even 30 MPa.

Particularly in the case of high-pressure gas discharge lamps and also in the case of extra-high-pressure gas discharge lamps, the electrodes are often formed from tungsten. The respective electrode can be designed for example in a pin- or rod-like fashion and, if appropriate, additionally also include a wire winding. In the case of these gas discharge lamps, a current density in the gas is generally so high that a low-pressure discharge upon starting immediately transitions to an arc discharge, such that the internal pressure increases greatly as a result of increasing temperature and possible evaporating filling constituents. Besides the electrodes that form the operating electrodes, in addition ignition electrodes can also be provided, for example in the case of mercury-vapor lamps or the like.

A generic ballast and also a generic method for operating same are described in EP 1 594 349 A1. The ballast includes a clocked energy converter in the manner of a step-down converter or a step-up converter, which serves to supply a lamp with electrical energy from an energy supply system. The ballast furthermore includes a damping element for reducing radio interference.

Furthermore, EP 0 837 620 A2 discloses a ballast and a method for operation for a metal-halide lamp and is concerned with the problem that convection within the discharge vessel of the metal-halide lamp during operation as intended causes an undesired curvature of the discharge arc if the electrodes of the metal-halide lamp, which are arranged with a spacing of approximately 3 mm, during operation as intended are not arranged in the upright position but rather in a horizontal position, for example, that is to say that a gap between the electrodes is horizontally aligned. In order to combat this problem, a high-frequency ripple current is superposed on a low-frequency rectangular-waveform current by the electrodes. This results in straightening of the arc. Nevertheless, undesired oscillations in a periphery of the arc discharge arise as a result if an amplitude of the ripple current exceeds a certain threshold value. In order to counteract this problem, EP 0 837 620 A2 proposes amplitude modulation of the high-frequency ripple current with a low-frequency signal.

Even if the abovementioned teaching has proved worthwhile, further disadvantages are nevertheless manifested. Firstly, flicker in the region surrounding the arc, also called halo, can be suppressed only to a limited extent and, secondly, a considerable control complexity is required in the ballast in order to implement the teaching of EP 0 837 620 A2. This is very complex and expensive and furthermore requires a considerable structural space.

SUMMARY

A gas discharge lamp includes at least two electrodes arranged in a manner spaced apart with a spacing in a discharge vessel filled with gas. A method of operating a ballast includes applying electrical energy to the electrodes. The ballast provides an electrical electrode current including a ripple current being dependent on an operating frequency of converter. Operating frequency is dependent on a charging time period and a discharging time period for an electrical energy store of the converter. The operating frequency is chosen such that the ripple current in the region of an arc discharge brings about a resonant excitation of the gas, and providing a pause time period between the discharging time periods and the respectively succeeding charging time period, the time duration of which pause time period is chosen such that a sum formed from the time periods attains the period duration corresponding to the operating frequency.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 11 shows a schematic block diagram of a ballast for the gas discharge lamp of the luminaire in accordance with FIG. 4.

DESCRIPTION

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

Figure 1:
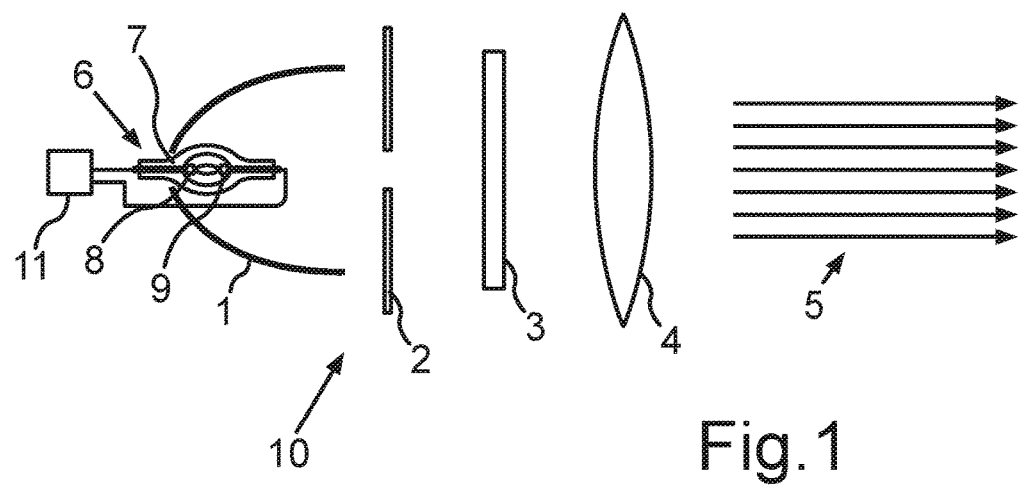
FIG. 1 shows, in a schematic sectional view, a luminaire including a gas discharge lamp and a ballast according to various embodiments.

FIG. 1 shows, in a schematic sectional illustration, an excerpt from a luminaire 10 including a gas discharge lamp 6, which in the present case is embodied as an extra-high-pressure mercury-vapor lamp, such as, for example, OSRAM P-VIP®, OSRAM Sirius®. The gas discharge lamp 6 includes a transparent discharge vessel 7 composed of quartz glass, in which in the present case two electrodes 8, 9 are arranged with a predefined spacing of approximately 1.3 millimeters. However, in principle, the electrode spacing can also be approximately 0.8 mm to approximately 1.5 mm. These values for the electrode spacing relate in particular to a gas discharge lamp 6 at the beginning of its operation as intended. In the present case, the electrodes 8, 9 are formed in each case from a tungsten pin supplementarily including a tungsten winding on the end side within the discharge vessel 7. The electrodes 8, 9 are led out from the discharge vessel 7 via lines 13, 14 (FIG. 4) and are connected to a ballast 11 via lines not designated more specifically. FIG. 11 shows a construction of the ballast 11 in a schematic block diagram illustration, which construction will be explained in further detail below.

In the present case, the gas discharge lamp 6 is arranged approximately at a focal point of a reflector 1, which is embodied as an elliptical reflector in the present case. On the opening side, in this order firstly a diaphragm 2, a transparent diffusor sheet 3 and a lens arrangement 4 are disposed downstream of the reflector 1. Instead of or in addition to the diffusor sheet 3, provision can also be made of other optically effective elements for influencing light, e.g. guiding light beams, which may include for example filter wheels, effect light wheels and/or the like. The optically effective elements can preferably be color filters, transparent or translucent or light-scattering sheets, prisms, lenses, mirrors and/or the like. The lens arrangement 4 is representative of customary optical components by means of which light emitted by the gas discharge lamp 6 is processed further in the luminaire 10 and is finally fed to a light exit opening in order thus to provide the light 5 emitted by the luminaire 10 (cf. FIG. 2, FIG. 3). It is evident from FIG. 2 and FIG. 3 that the luminaire 10 includes a luminaire housing 32, which accommodates the abovementioned parts illustrated in FIG. 1.

Figure 2:
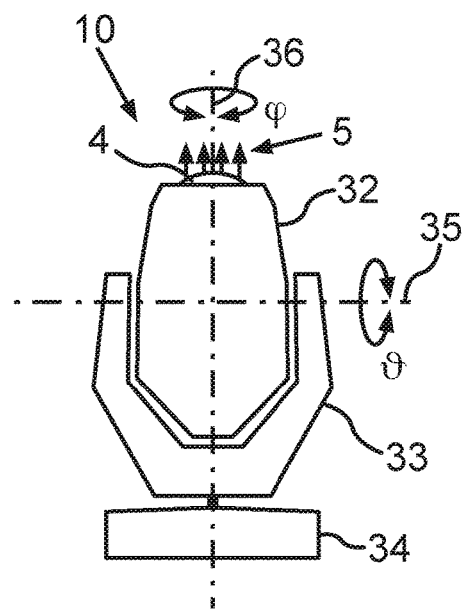
FIG. 2 shows, in a schematic illustration, the luminaire in accordance with FIG. 1 with a cardanic suspension in a first pivoting and rotational position.
Figure 3:
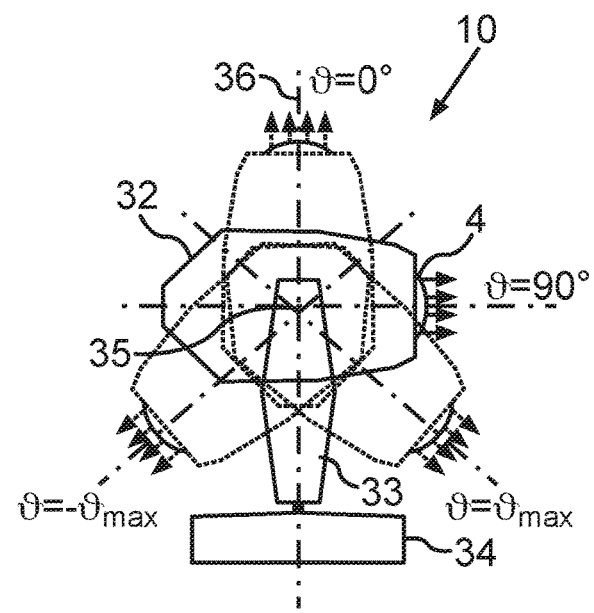
FIG. 3 shows a schematic illustration in accordance with FIG. 2 in a second rotational position with three different pivoting positions.

It is furthermore evident from FIG. 2 and FIG. 3 that the luminaire 10, that is to say its luminaire housing 32, is cardanically suspended by virtue of its being secured on a U-shaped clip 33 in a manner pivotable about a pivoting axis 35, said clip for its part being secured on a securing plate 34 in a manner rotatable about a rotation axis 36. In various embodiments, the securing plate 34 is embodied as a luminaire base in which also parts of drive electronics (not illustrated) and also the ballast are arranged in the present case. As a result, the luminaire housing 32 of the luminaire 10 can both be rotated about the rotation axis 36 at an angle $\varphi$ and furthermore be pivoted about the pivoting axis 35 by an angle $\vartheta$. FIG. 3 shows various pivoting positions of the luminaire housing 32 relative to the U-shaped clip 33, wherein the rotation axis 36 is aligned perpendicularly with respect to a plane of the drawing.

Light emitted by the gas discharge lamp 6 thus firstly passes through the diaphragm 2, which is provided for reducing the intensity. The diaphragm 2 can be embodied for example as an iris diaphragm or else as a crescent diaphragm. The light then passes through the diffusor sheet 3, which can be embodied as a color filter, Gobo or the like. For this purpose, systems are known which consist for example of a plurality of rotatable wheels which are arranged one behind another and which enable a multiplicity of settings combinable with one another for influencing the light beam with regard to intensity, color, shape, angular distribution and/or the like. Finally, the light passes through the lens 4, which is illustrated here as representative of a lens optical unit in FIG. 1.

FIG. 2 and FIG. 3 show the movement axes of the luminaire 10, which is also called moving head in the present case. The arrangement shown therein has three components mounted rotatably relative to one another, namely the securing plate 34 having connections and securing means, such that the luminaire 10 can be secured for example on a floor or on a ceiling, the U-shaped clip 33 and also the actual luminaire 10 including the lens arrangement 4 as light exit optical unit or light exit opening. In this case, the U-shaped clip 33 is rotatable about the rotation axis 36 by the angle $\varphi$, which is an azimuth angle in the present case. By contrast, the luminaire housing 32 is rotatable relative to the U-shaped clip 33 about the pivoting axis 35 by the angle $\vartheta$, which is a polar angle in the present case. The axes 35, 36 are perpendicular to one another in the present case. With the notation chosen in FIG. 2 and FIG. 3, a light emission of the light 5 along the rotation axis 36 corresponds to an angle $\vartheta$ of 0° or +/−180°, whereas a horizontal beam direction in a plane including the pivoting axis 35 corresponds to an angle $\vartheta$ of +/−90°. $\vartheta_{max}$ denotes a maximum angle.

Figure 4:
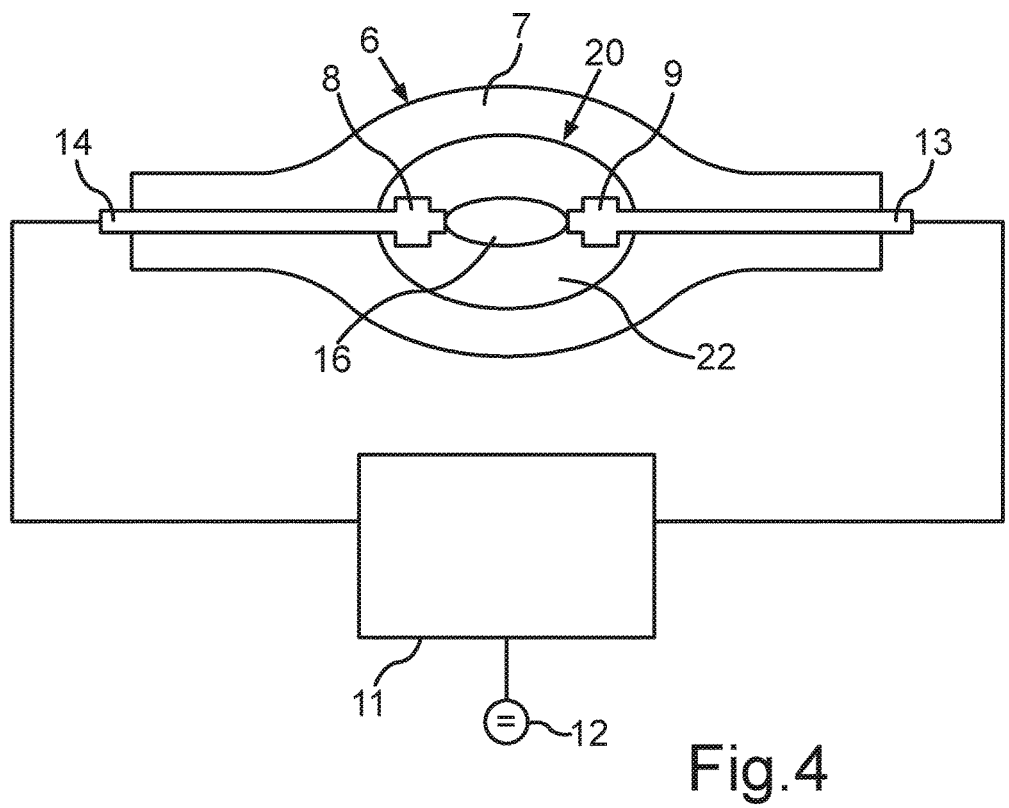
FIG. 4 shows a schematic illustration of an excerpt from the luminaire in accordance with FIG. 1, which shows the gas discharge lamp connected to the ballast.

FIG. 4 shows an enlarged illustration of an excerpt from FIG. 1, which illustrates the gas discharge lamp 6 and the ballast 11 connected thereto in an enlarged manner. The ballast 11 is supplied with electrical energy from the luminaire. Alternatively, however, some other energy source, such as the public energy supply system or the like, can also be provided. In the present case, at 12 a DC voltage is fed to a current regulator stage 58 (FIG. 11). In the present case, the current regulator stage 58 includes a step-down converter 15 designed to regulate an output current to an instantaneous setpoint value. By means of a bridge inverter 54, the output current is converted into a bipolar AC current. Furthermore, an ignition stage 55 is provided, which is designed to provide a suitable high voltage for the ignition of the gas discharge lamp 6. The ballast 11 is controlled by means of a control unit 56, which controls not only the step-down converter 15 but also the bridge inverter 54 and the ignition stage 55 e.g. with respect to a sequence of a lamp ignition of the gas discharge lamp 6. With respect to the step-down converter 15, the control unit 56 controls e.g. a timing, an instantaneous setpoint current. The control unit 56 furthermore has a bidirectional communication interface 57, via which it is connected to a superordinate luminaire controller of the luminaire 10 for communication therewith.

The ballast 11 is designed to apply electrical energy to the electrodes 8, 9 via lines (not designated), such that an arc discharge 16 occurs between the electrodes 8, 9. In the present case, the arc discharge 16 is represented by an ellipse between the electrodes 8, 9.

Figure 7:
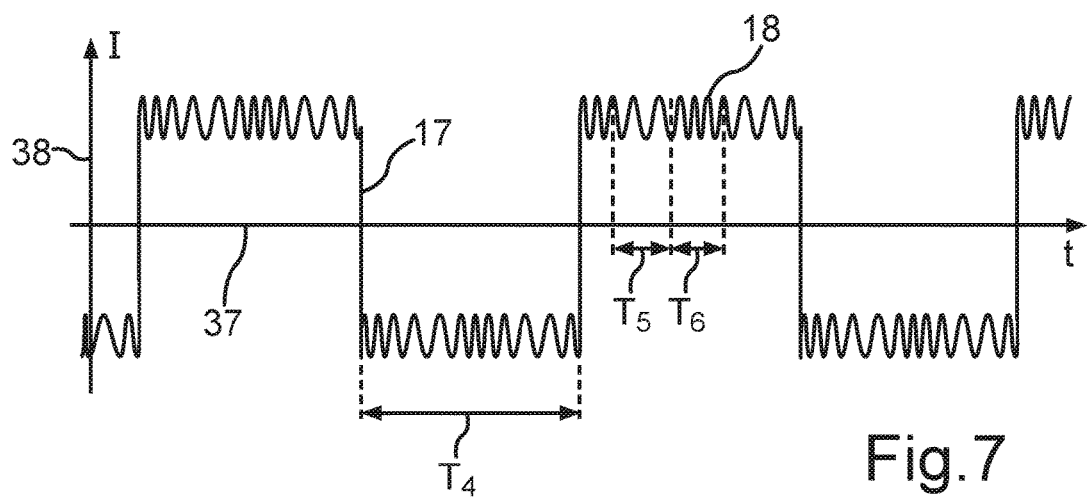
FIG. 7 shows a current-time diagram in a schematic illustration, by means of which an electrode current including a ripple current provided by the ballast is illustrated by means of a graph.

For this purpose, the ballast 11 is designed to provide a suitable electrical electrode current 17 including a ripple current 18 having a ripple current frequency (cf. FIG. 7). The ripple current frequency is determined by an operating frequency of the step-down converter 15. The operating frequency of the step-down converter 15 is in turn dependent on a charging time period $T_1$ and a discharging time period $T_2$ for an electrical energy store 19 of the step-down converter 15, which is embodied as a storage inductor in the present case. The ballast 11 or the step-down converter 15 thereof is furthermore designed to set the operating frequency in such a way that the ripple current 18 in the region of the arc discharge 16 brings about a resonant excitation of the gas 20 enclosed in the discharge vessel 7.

The light 5 provided by the gas discharge lamp 6 is substantially emitted by the arc discharge 16 between the electrodes 8, 9. However, a region 22 around the arc discharge 16, also called halo, also emits light, even though it is significantly less intensive than the light liberated by the arc discharge 16. The halo can extend over the entire space provided by the discharge vessel 7.

Figure 5:
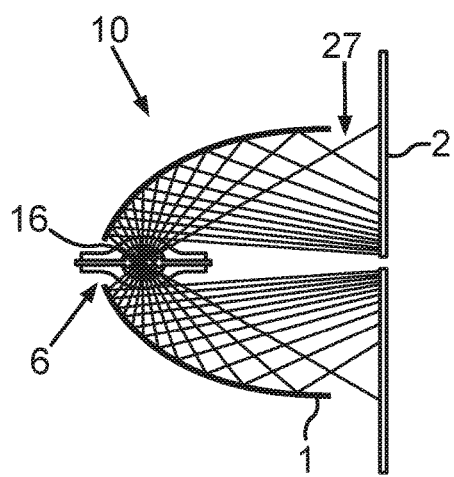
FIG. 5 shows an excerpt from FIG. 1 with a schematic illustration of a propagation of light emitted in the region of an arc discharge.

FIG. 5 shows, in a schematic illustration of an excerpt from FIG. 1, a light emission proceeding from the arc discharge 16 as illustrated in accordance with FIG. 4. The illustration shows the diaphragm 2 having a very small aperture, such that light from a center of the arc discharge 16 of the gas discharge lamp 6 is substantially masked out. This is elucidated by a beam 27 in FIG. 5. It can be discerned that substantially no light of the arc discharge 16 passes through the diaphragm 2.

Figure 6:
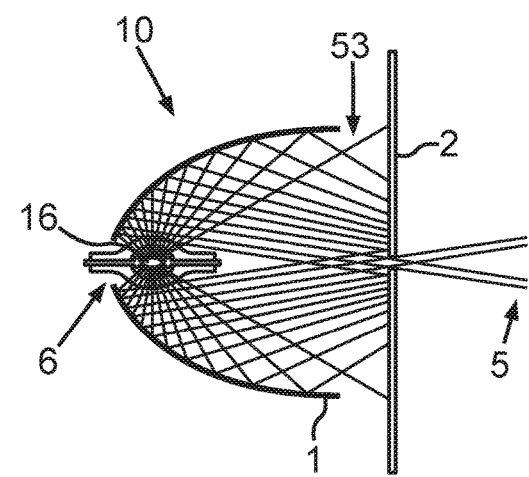
FIG. 6 shows a schematic illustration like FIG. 5, a propagation of light from a region surrounding the arc discharge being illustrated here.

FIG. 6 schematically shows an illustration like FIG. 5, wherein here, however, instead of the light beam 27 for light emerging from the arc discharge 16 a beam 53 is illustrated which illustrates light emerging from the halo. It can be discerned that part of the light of the halo passes through the diaphragm 2.

Since the region of the halo tends to emit light with flicker, this has the result that flicker in the region of the halo also affects the luminous function of the luminaire 10. In the case of a diaphragm setting that transmits only little light, that means that the light, which is low anyway with regard to the intensity, is particularly adversely affected by the flicker in the region of the halo. In the prior art, this phenomenon can be avoided by the use of an integrator, for example a rod or else a fly's eye. However, this is very complex and expensive, which is why such configurations are generally disregarded.

The control method according to various embodiments makes it possible, particularly with existing ballasts or step-down converters, to achieve a stabilization of the light emission in the region of the halo, such that the undesired flicker can be reduced.

Figure 8:
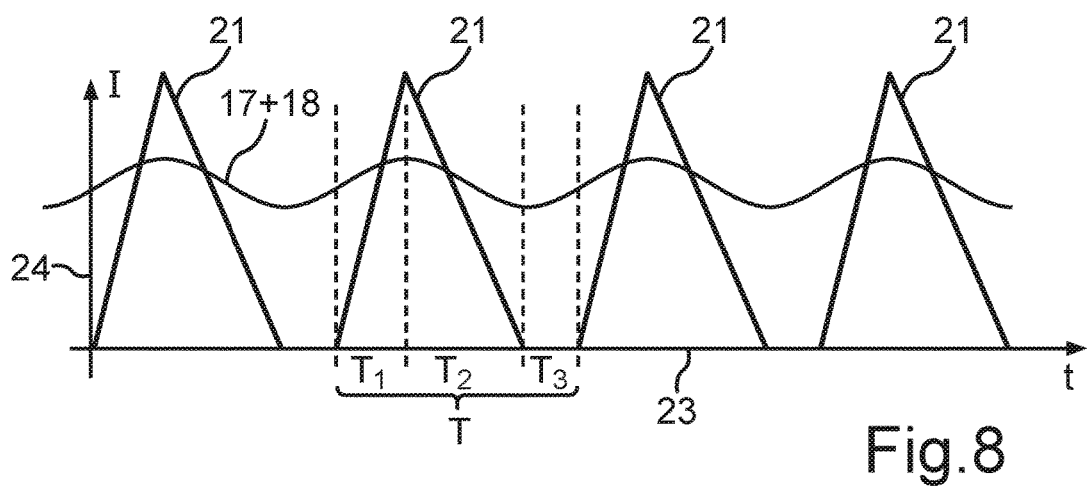
FIG. 8 shows a further current-time diagram like FIG. 7 in a schematic illustration, wherein a first graph illustrates the electrode current and a second graph illustrates a current of an energy store of a step-down converter of the ballast.

FIG. 8 shows a current-time diagram, in which the operation according to various embodiments of the step-down converter 15 is schematically illustrated by means of a graph. An abscissa 23 denotes time, whereas an ordinate 24 is assigned to the current. The electrode current 17 is schematically illustrated by means of a graph. A further graph 21 schematically shows a current profile of the current through the storage inductor 19 of the step-down converter 15.

It can be discerned that a charging time period $T_1$ is followed by a discharging time period $T_2$. The current amplitude is a measure of the energy stored in the storage inductor 19. It can furthermore be discerned that an additional pause time period $T_3$ is provided between the respective one of the discharging time periods $T_2$ and the respectively, e.g. directly, succeeding charging time period $T_1$. A sum formed from a discharging time period $T_2$, the succeeding charging time period $T_1$ and the pause time period $T_3$ provided therebetween is set by the choice of the pause time period $T_3$ such that the period duration T corresponding to the operating frequency is attained, such that the operating frequency corresponds to the ripple current frequency of the ripple current 18 of the electrode current 17. This is evident from FIG. 8. The graph in FIG. 8 illustrates the electrode current 17 including the ripple current 18. By varying the pause time $T_3$, it is possible in a simple manner to generate a sweep, e.g. a frequency sweep. What can be achieved by means of this method implementation is that flicker in the region of the halo is reduced, if not even completely suppressed.

The magnitude of the electrode current 17 can be determined by the charging time period $T_1$. In this case, it should be taken into consideration that, in the case of the pause time period $T_3$ being lengthened, a charging time period $T_3$ likewise chosen to be correspondingly longer may be necessary if the average electrode current 17 is intended to be substantially unchanged.

Figure 9:
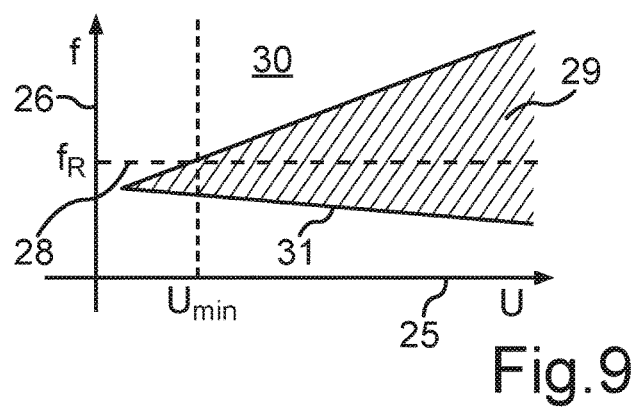
FIG. 9 shows a frequency-voltage diagram for schematically illustrating an operating range for the ballast according to various embodiments.

FIG. 9 shows, in a schematic frequency-voltage diagram, an operating range 29 for the operating frequency of the step-down converter 15 as a function of an operating voltage U for a given output power of the step-down converter 15. An abscissa 25 of the diagram in FIG. 9 is assigned to the operating voltage U, and an ordinate 26 of the diagram in FIG. 9 is assigned to the operating frequency f. It is evident from FIG. 9 that as the frequency increases, the possible operating range 29 is limited by a transition to non-intermittent operation of the step-down converter 15, which is identified here by 30. Increased switching losses occur here during intended operation of the step-down converter 15. With decreasing frequencies, a limitation 31 results from the maximum possible magnetization of the storage inductor 19. The dimensioning of the ballast 11 or of the step-down converter 15 should e.g. therefore be provided such that the desired ripple current frequency $f_R$, which is represented by a dashed straight line 28 in the diagram in FIG. 9, can be generated over as far as possible the entire range of the operating voltage U that occurs, said range preferably being at least greater than a minimum voltage $U_{min}$. This is represented by the operating range 29.

FIG. 7 shows a further current-time diagram, wherein an electrode current 17 according to various embodiments is illustrated by means of a graph. An abscissa 37 is assigned to time and an ordinate 38 is assigned to the electrode current 17. It can be discerned that the electrode current 17 is formed with a substantially rectangular waveform. It can furthermore be discerned that the ripple current 18 is superposed on the rectangular-waveform electrode current 17.

It is furthermore evident from FIG. 7 that the ripple current frequency is not constant within a half-cycle $T_4$ of the rectangular-waveform electrode current 17. The ripple current frequency is thus varied in the range between a lower threshold and an upper threshold. This is indicated by $T_5$ and $T_6$ in FIG. 7. Both a discrete and a continuous variation of the frequency can be provided. This measure likewise makes it possible to achieve a stabilization of the flicker e.g. in the region of the halo. Furthermore, what can thereby be achieved is that aging of the electrodes 8, 9 and thus also effects on the lifetime of the gas discharge lamp 6 can be reduced.

Figure 10:
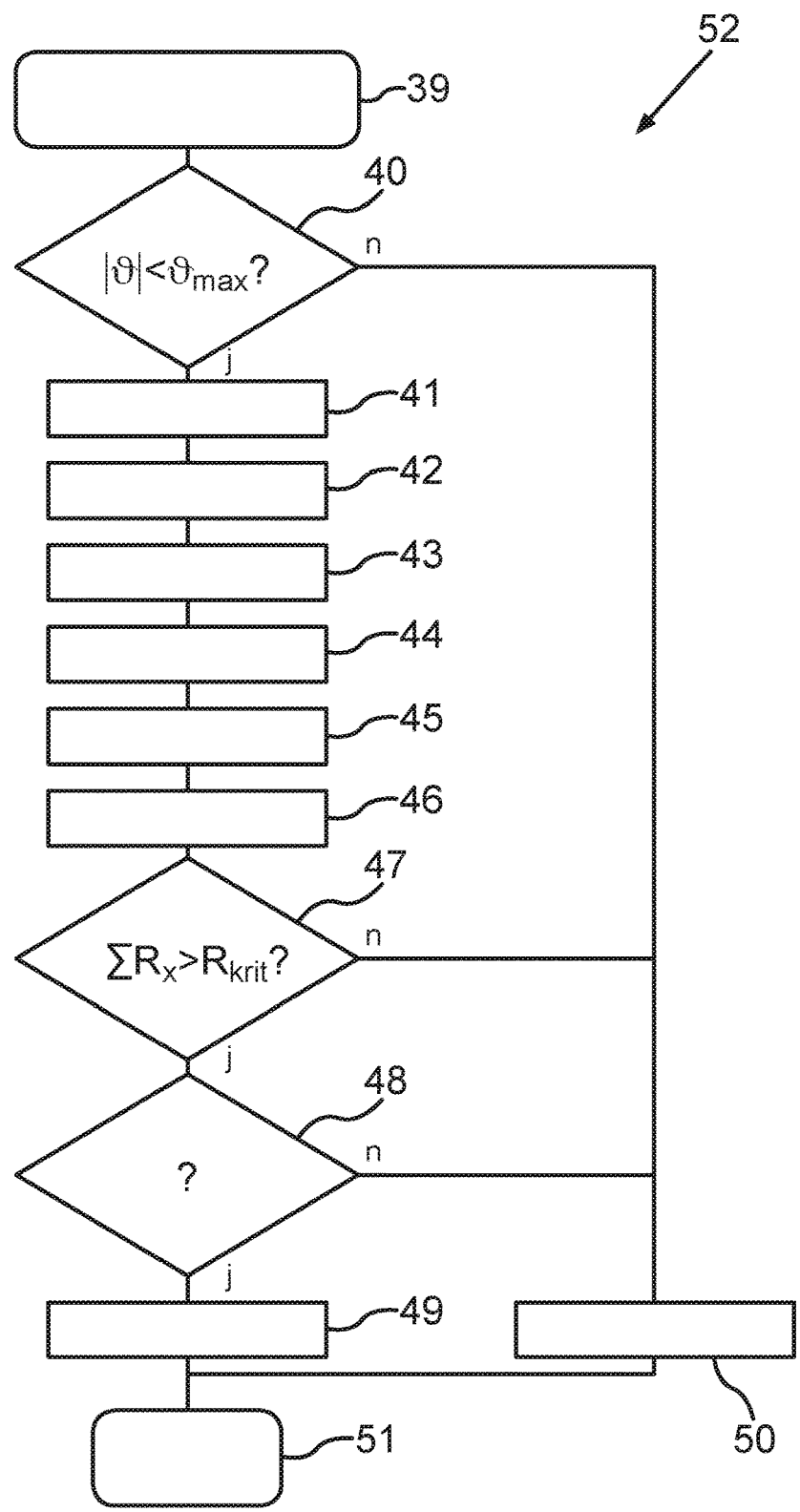
FIG. 10 shows a schematic flow diagram for a method implementation according to various embodiments by means of the ballast.

FIG. 10 shows a schematic method sequence 52 such as can be implemented by the ballast 11 in order to reduce effects on the aging of the electrodes 8, 9 and the gas discharge lamp 6. In 39, the method implementation according to various embodiments begins, which is called periodically from a main loop of the program for the operation of the ballast 11. Firstly, a check ensues in step 40 to ascertain whether the polar angle $\vartheta$ is critical. For this purpose, the limit values $\vartheta_1$ for a lower limit value and $\vartheta_{max}$ for an upper limit value are specified, for example values near the horizontal, for example +/−20 degrees. If it turns out that an absolute value of the polar angle $\vartheta$ determined does not lie between these two values, at n a branching to step 50 takes place and a generation of the ripple current 18 is deactivated. From 50, the method is then continued to 51, where the method implementation according to various embodiments is ended or is repeated in the manner of a loop by returning to the main loop mentioned above.

If the check of the polar angle $\vartheta$ in step 40 reveals that said angle is critical, a branching takes place in the direction of y and firstly an evaluation of Gobo $R_G$ takes place in 41.

This is followed by a further evaluation of a movement $R_M$ in 42. This is followed by an evaluation of an effect $R_E$ in a step 43, whereupon the evaluation of the diaphragm $R_B$ takes place in 44. Finally, a further evaluation of the zoom $R_O$ takes place in 45. The following, optional process 46 denotes further possible evaluation criteria. In 47, the results of the abovementioned evaluations in 41 to 46 are summed to form a value $\Sigma R_x$ and compared with a comparison value $R_{crit}$ for a critical evaluation. In this case, the various evaluation parameters $R_G$, $R_M$, $R_E$, $R_B$, $R_O$, and/or the like can also be provided with a respective weighting factor and thus weighted relative to one another. A critical evaluation is present if the sum of the evaluations is greater than the comparison value $R_{crit}$. If critical operation is not manifested, a branching takes place in the direction of n to 50 and the method is continued—as already explained above. Otherwise, a branching takes place in the direction of y and 48 is carried out.

The evaluation parameter $R_M$ relates e.g. to a movement of the luminaire housing 32 about the pivoting axis 35 and/or the rotation axis 36, the gas discharge lamp 6 being held by said luminaire housing. In this regard, this parameter takes account for example of the factor that flicker is perceived by the human eye to a lesser extent, and is accordingly all the less disturbing, the faster such movement is.

The evaluation parameter $R_E$ relates to effects that can be generated for example by means of the filter or effect wheels indicated above, such as the diffusor sheet 3, for example. In the case of some of the effects achievable thereby, the light can be altered to an extent such that flicker is no longer perceived significantly or is perceived less significantly or is no longer disturbing. Effects that greatly alter the light in the manner described above are for example frosting elements and/or scattering elements and/or prism elements.

The evaluation parameter $R_B$ relates for example to the diaphragm 2 specified above. The larger an aperture width of the diaphragm 2, the less disturbing flicker can be, for example.

The evaluation parameter $R_G$ relates to mask-like elements which are shaped or structured to different extents and which can be arranged in the beam path. The more greatly pronounced this structuring or shaping, the less disturbing flicker can be.

The evaluation parameter $R_O$ relates to effective spot diameters of varying sizes which can be set or which can be imaged with varying sharpness. In this case, spot is taken to mean the light 5 which is emitted by the luminaire 10 and which impinges for example on a projection surface spaced apart from the luminaire 10, for example a wall, e.g. a projection screen, or the like. The smaller the spot or the sharper the spot, the less disturbing flicker can be.

By contrast, if operation has been determined as critical in 47, a further check takes place in 48. 48 involves checking whether a maximum use duration for the activation of the ripple current 18, that is to say a predefined total operating duration, has been exceeded. This involves a total time that is determined over the entire operating duration of the gas discharge lamp 6. If the maximum use duration has been exceeded, a branching takes place in the direction of n to 50 and the method is continued—as already explained above.

If the maximum use duration has not been exceeded, a branching takes place in the direction of y to 49, and the ripple current 18 is activated. From 49, the method is then continued directly to 51, where the method is ended and e.g. returned to the main loop mentioned above.

The invention thus makes it possible to minimize the effects on the electrodes 8, 9 and also the gas discharge lamp 6 on account of the ripple current 18.

The exemplary embodiments serve merely for elucidating the invention and are not intended to restrict the latter. Of course, features of the exemplary embodiments can also be combined in any desired way with further features of the invention in order to arrive at further configurations within the meaning of the invention. By way of example, 41 to 47 can be combined virtually arbitrarily with one another, that is to say at least only one of said processes need be provided. Furthermore, method features can also be formulated in terms of device features, and vice versa.

Various embodiments provide an improved control method and also an improved ballast and an improved luminaire with which the complexity for reducing flicker in the region around the arc discharge can be reduced.

With respect to a generic method it is proposed, for example, that an additional pause time period is provided between a respective one of the discharging time periods and the respectively succeeding charging time period, the time duration of which pause time period is chosen in such a way that a sum formed from the respective successive time periods, specifically the discharging time period, the succeeding charging time period and the pause time period provided therebetween, attains the period duration corresponding to the operating frequency.

With respect to a generic ballast it is proposed, for example, that the step-down converter is furthermore designed to provide an additional pause time period between a respective one of the discharging time periods and the respectively succeeding charging time period, the time duration of which pause time period is chosen in such a way that a sum formed from the respective successive time periods, specifically the discharging time period, the succeeding charging time period and the pause time period provided therebetween, attains the period duration corresponding to the operating frequency.

With respect to a generic luminaire it is proposed, for example, that said luminaire includes a ballast according to various embodiments.

With regard to the first aspect, various embodiments are based on the insight that a fixed flow pattern can be imposed on the gas by excitation of specific mechanical and/or acoustic resonances in the gas, e.g. in the region of the arc discharge. For this purpose, resonances are excited in the high-frequency range, for example in a frequency range of approximately 10 kHz to approximately 60 kHz, e.g. in a range of approximately 20 kHz to approximately 50 kHz. As a result, the disturbing flicker of the halo can be significantly reduced if not even virtually completely suppressed. The resonances can be excited by the ripple current being provided with a corresponding frequency, namely the ripple current frequency. The resonance is often not just a resonance at a single frequency, rather resonances at further frequencies can also occur. The ripple current can accordingly include for example not just a single ripple current frequency but also a plurality thereof, which are coordinated with further resonances and/or occur as harmonics of a fundamental frequency. A plurality of resonances can be caused for example by different flow patterns in the discharge vessel, for example in the case of sound waves formed azimuthally, longitudinally and/or in suchlike ways.

In the case of a step-down converter which uses for example a storage inductor as energy store, the operating frequency can be determined by the charging time and the discharging time or a magnetization time and a demagnetization time of the storage inductor.

In order to be able to correspondingly adapt the ripple current frequency, the pause time is provided, which can be set in a suitable manner in order to be able to provide the operating frequency and thus also the desired ripple current frequency. As a result, it is also possible in a simple manner to be able to adapt or else vary the ripple current frequency. In this regard, the invention makes it possible, for example, to rhythmically vary the ripple current frequency in order to generate for example a so-called sweep or the like. As a result, it is possible to detect deviations with respect to resonances and with respect to tolerances regarding the desired function. In principle, the operating frequency need not be a single frequency, rather it can also be formed by a suitable superimposition of a plurality of frequencies, and include harmonics, for example. As a result, by way of example, a waveform of the ripple current can be influenced. Furthermore, provision can be made for the ripple current itself to include harmonics that act on the gas in a desired manner.

Various embodiments thus make it possible to significantly reduce flicker in the region surrounding the arc discharge, particularly in the case of horizontally aligned electrodes. Various embodiments make it possible to excite a multiplicity of resonances substantially simultaneously, such that the flicker-suppressing effect can be improved.

In accordance with one development, it is therefore also proposed that the pause time period is varied within a predefined time interval. The varying can be effected continuously over a predefined time span. By way of example, the pause time period can be varied linearly within said time span. Furthermore, other variations of the pause time period or variations of the time period can also be realized, of course, depending on the situation in the gas. This can be realized in a simple manner with the invention because the time scheme according to various embodiments allows existing step-down converters to continue to be used and merely a corresponding control to be adapted. In this way it is also possible to retrofit the invention in already existing ballasts.

Furthermore, it is proposed that a mechanical resonance of the gas in the region of the arc discharge is determined by means of a resonance determining unit and the operating frequency is set by setting of the pause time period depending on the mechanical resonance determined. The mechanical resonance may be an acoustic resonance in the gas. In various embodiments, the mechanical resonance at least partly results in the resonant excitation of the gas enclosed in the discharge vessel. However, it is also possible to excite a plurality of mechanical resonances, e.g. also harmonics and/or the like. As a result, it is possible to achieve the effect of the invention even with a small ripple current. As a result, at the same time it is also possible to reduce effects on the electrodes, such that a lifetime of the gas discharge lamp can be lengthened.

It may be provided if, by means of a sensor unit, a spatial alignment of the electrodes of the gas discharge lamp is detected and the ripple current is provided depending on the spatial alignment determined. This configuration makes use of the insight that the undesired flicker in the region around the arc discharge occurs particularly in the case of a horizontally aligned arrangement of the electrodes. By contrast, if the electrodes are aligned vertically, the flicker generally scarcely occurs or does not occur at all. Therefore, the application of the ripple current is unnecessary, in principle, in the case of a vertical alignment. There is therefore the possibility of controlling the gas discharge lamp by means of the ballast in such a way that ripple current is applied to the gas discharge lamp only when this is necessary from the standpoint of suppressing flicker. By means of the sensor unit that can detect the spatial alignment, this can be achieved taking account of the prior insights. For this purpose, it is possible additionally to consult families of characteristic curves, for example on the basis of empirical investigations or the like, in order to further improve the method implementation. In this regard, it is possible, for example, to determine a pivoting angle of an alignment of the electrodes relative to a horizontal. A comparison value for the pivoting angle can be predefined, starting from which the ripple current is intended to be activated. If the comparison value is exceeded by the pivoting angle in the direction of the vertical, by contrast provision can be made for the ripple current to be deactivated. Furthermore, provision can be made, of course, for the ripple current to be set at least partly depending on the pivoting angle, for example by an amplitude and/or a frequency being set depending on the pivoting angle at least over a predefined range of the pivoting angle. This may have the effect, moreover, that in the region of the ballast, too, complexity for the corresponding ripple current generation can be adapted or else, if appropriate, reduced.

Furthermore, it is proposed that providing the ripple current is limited to a predefined proportional time period of an average lifetime, in particular of the gas discharge lamp. This configuration makes use of the insight that application of the ripple current can adversely affect the lifetime of the gas discharge lamp. This configuration takes account of the fact that the electrodes can age not only as a result of erosion but also mechanically, for example on account of material fatigue on account of, for example, mechanical, chemical and/or suchlike stress. The electrodes can for example break off, deform or the like. If the electrodes additionally have a wire winding, for example composed of tungsten or an alloy thereof, in order for example to increase a mass of the respective electrode, parts of the wire winding or the like can drop off or deform in an undesired manner. The ripple current can promote such aging.

In order to reduce such aging effects, provision can be made for the ripple current to provided only for part of the time period of the average lifetime for the intended function of the gas discharge lamp. What can thereby be achieved, for example, is that the effect of the ripple current on the average lifetime of the gas discharge lamp is reduced, such that a practical lifetime of the gas discharge lamp can be achieved even with use of the ripple current. What can be achieved on the other hand is that the permanent deactivation of the ripple current provides a message which indicates to a user that a significant proportion of the lifetime of the gas discharge lamp has already elapsed. By way of example, said proportion can be approximately 50% of the average lifetime, e.g. approximately 70% of the average lifetime, e.g. approximately 85% of the average lifetime.

It may be provided that the ripple current is automatically ended after a predefined first time span has elapsed. This configuration makes use of the effect that the ripple current is provided only for the predefined first time span. The predefined first time span can be for example a few minutes, but also approximately half an hour or approximately a whole hour, in particular also a plurality of hours. The predefined first time span can also be adjustable, of course, in order that the operation of the gas discharge lamp can be expediently adapted to individual requirements. After the predefined first time span has elapsed, the flicker that is then possibly reestablished is accepted. Depending on the application, however, it can also be provided that the predefined first time span is adapted to envisaged operation of the gas discharge lamp and takes account of the fact that the gas discharge lamp is set in a varied manner with regard to its orientation at specific points in time. As a result, the spatial alignment of the electrode arrangement also changes, which, for example in the case of pivoting of the gas discharge lamp in such a way that the electrodes are aligned into a vertical plane, has the effect that the ripple current need not be necessary anymore anyway.

Furthermore, it is proposed that providing the ripple current is automatically activated again after a predefined second time span has elapsed. In various embodiments, the second time span directly follows the elapsing of the first time span. As a result, a clocking of the ripple current can be achieved, which can be chosen in such a way that an adverse effect as a result of flicker is as far as possible tolerable. The second time span can therefore be chosen for example in manner corresponding to the first time span. Of course, it can also be provided that not only the first but also the second time span can be varied, for example if the properties of the gas discharge lamp, e.g. of the gas, vary accordingly.

In principle, however, the first and second time spans can also be chosen such that they are adapted for example to physical properties of the gas. In various embodiments, this configuration uses a time constant of the gas, which represents a measure in respect of after what time after the ripple current has been switched off significant flicker occurs again. In various embodiments, the predefined second time span is chosen in such a way that the ripple current is activated again before significant flicker occurs. Here, too, empirical measurement data can be consulted in order to adapt the method implementation, e.g. regarding the time spans to be chosen. For this purpose, the first and second time spans can be chosen to be identical or else different from one another in a suitable way. The first and second time spans can be a few milliseconds, for example. By way of example, a range for the first and/or the second time span of approximately 1 ms to approximately 100 ms can be provided, depending on the respective gas and, if appropriate, further e.g. mechanical properties such as an electrode spacing and/or, in relation to a discharge vessel, a length, a cross section, e.g. with respect to a cross-sectional shape or dimensions of the cross section and/or the like.

Furthermore, it is proposed that a total time of providing the ripple current is detected and providing the ripple current is permanently deactivated upon the total time exceeding a comparison value. The total time preferably relates to the operating duration of the gas discharge lamp. The comparison value relates to the entire operating duration provided and may be a predefined proportion thereof. This configuration affords the effect that after the elapsing of a total time of providing the ripple current, said total time being determined by the comparison value, ripple current is not applied to the gas discharge lamp anymore. Although this then has the effect that flicker occurs again, this has the effect that, as a result of the permanent deactivation of the ripple current, the lifetime of the gas discharge lamp is not adversely affected further by the ripple current. Furthermore, provision can be made for the total time for providing the ripple current to be used to predefine the comparison value. In this regard, by way of example, it can be provided that, with greater total time, the comparison value is likewise chosen to be greater. In this regard, in one configuration, provision can be made for predefining the comparison value at the beginning of a start-up of the gas discharge lamp at 5 hours for a time period of 20 hours. Afterward, it is possible to increase the comparison value for a predefined supplementary time period, for example a further 20 hours, for example to 6 hours or the like.

It is furthermore provided to reduce negative effects on the lifetime of the gas discharge lamp.

For a generic method it is furthermore proposed that at least one operating parameter of the ripple current assumes a first predefined value in a first time period and a second predefined value in a second time period, which is different than the first time period.

With regard to a generic ballast it is furthermore proposed that the ballast is designed such that at least one operating parameter of the ripple current assumes a first predefined value in a first time period and a second predefined value in a second time period, which is different than the first time period.

With regard to a generic luminaire, various embodiments propose, for example, that said luminaire includes a ballast according to various embodiments.

A second aspect of various embodiments is based on the insight that undesired effects of the ripple current with regard to the aging of the gas discharge lamp can be reduced by different operating parameters of the ripple current in different time periods.

In this regard, it has been found, for example, that operation in accordance with the teaching of EP 0 837 620 A2 has the effect that the electrodes are subject to a higher stress, e.g. to a more severely pronounced material fatigue, and the envisaged lifetime of the gas discharge lamp is thus in part considerably undershot.

Various embodiments propose for a second aspect that at least one operating parameter of the ripple current assumes a first predefined value in a first time period and a second predefined value in a second time period, which is different than the first time period. As a result, it is possible to reduce the application of the ripple current to the gas discharge lamp, specifically in such a way that the abovementioned flicker can largely be avoided at the same time. In this regard, it is possible to provide the operating parameter of the ripple current with different values in the two time periods in such a way that an effect on aging of the electrodes and thus also on a lifetime of the gas discharge lamp can be reduced. Various embodiments thus afford a multiplicity of influencing possibilities which, on the one hand, allow a reliable reduction or suppression of flicker and, on the other hand, reduce the effects on electrode aging and/or lifetime of the gas discharge lamp.

In various embodiments, the first predefined value is formed by a first frequency and/or a first amplitude of the ripple current. The first frequency and/or first amplitude can be chosen such that a reliable reduction and/or suppression of flicker during intended operation of the gas discharge luminaire is achieved. In this case, the first predefined value is preferably chosen in such a way that the ripple current overall remains as small as possible. The value of the ripple current can be determined for example empirically during intended operation of the gas discharge lamp. Furthermore, there is of course the possibility of alternatively or supplementarily also consulting families of characteristic curves.

The resonance is often not just a resonance at a single frequency, rather resonances at further frequencies can also occur. The ripple current can accordingly include for example not just a single ripple current frequency but also a plurality thereof, which are coordinated with further resonances and/or occur as harmonics of a fundamental frequency. A plurality of resonances can be caused for example by different flow patterns in the discharge vessel, for example in the case of sound waves formed azimuthally, longitudinally and/or in suchlike ways.

In various embodiments, the second predefined value is formed by a second frequency and/or a second amplitude of the ripple current. The second frequency and/or the second amplitude can be chosen for example in such a way that the ripple current overall in the second time period is smaller than in the first time period. As a result, although flicker can not be completely suppressed with this ripple current, what can be achieved is that an adverse effect as a result of flicker is as far as possible tolerable. The second time span can therefore be chosen for example in a manner corresponding to the first time span. Of course, it can also be provided that not only the first but also the second time span can be varied, for example if the properties of the gas discharge lamp, e.g. of the gas, vary accordingly.

However, it is also possible to use time constants of the gas which determine a reoccurrence of the flicker. As a result, it is possible to further reduce the effect of the ripple current on the aging of the electrodes and/or the lifetime of the gas discharge lamp.

It is provided that the second predefined value is zero or assumes negligibly small values at least with respect to additional aging phenomena of the electrodes that are caused by the ripple current. In this case, clocking of the ripple current is achieved by the invention, wherein a clock frequency on account of the clocking is chosen in such a way that significant flicker can substantially be avoided. This can be achieved by suitable selection of the first and second time periods. In order to be able to set the ripple current, properties of the ballast can be used, e.g. a functionality of a smoothing capacitor. In this regard, it can be provided that, for deactivating the ripple current, the ripple current frequency is varied such that the ripple current frequency is in a range in which the smoothing capacitor is particularly effective. As a result, the ripple current can be sufficiently damped. By contrast, if the ripple current is intended to be activated, provision can be made for the ripple current frequency to be varied such that the ripple current frequency is in a range in which the smoothing capacitor has only a low efficacy, such that the ripple current is damped as little as possible. As a result, the ripple current can be set only by frequency shifting.

It may be provided that, by means of a sensor unit, a spatial alignment of the electrodes of the gas discharge lamp is detected and the ripple current is provided depending on the spatial alignment determined. This configuration makes use of the insight that the undesired flicker in the region around the arc discharge occurs particularly in the case of a horizontally aligned arrangement of the electrodes. By contrast, if the electrodes are aligned vertically, the flicker generally scarcely occurs or does not occur at all. Therefore, the application of the ripple current is unnecessary, in principle, in the case of a vertical alignment. There is therefore the possibility of controlling the gas discharge lamp by means of the ballast in such a way that ripple current is applied to the gas discharge lamp only when this is necessary from the standpoint of suppressing flicker. By means of the sensor unit that can detect the spatial alignment, this can be achieved taking account of the prior insights. For this purpose, it is possible additionally to consult families of characteristic curves, for example on the basis of empirical investigations or the like, in order to further improve the method implementation. In this regard, it is possible, for example, to determine a pivoting angle of an alignment of the electrodes relative to a horizontal. A comparison value for the pivoting angle can be predefined, starting from which the ripple current is intended to be activated. If the comparison value is exceeded by the pivoting angle in the direction of the vertical, by contrast provision can be made for the ripple current to be deactivated. Furthermore, provision can be made, of course, for the ripple current to be set at least partly depending on the pivoting angle, for example by an amplitude and/or a frequency being set depending on the pivoting angle at least over a predefined range of the pivoting angle. This may have the effect, moreover, that in the region of the ballast, too, complexity for the corresponding ripple current generation can be adapted or else, if appropriate, reduced. Furthermore, provision can also be made for the sensor unit to detect end stops of a pivoting region of the luminaire and to provide corresponding position data. Depending on said position data, it is then possible to set predefined pivoting states of the luminaire by suitable pivoting signals. By this means, too, the spatial alignment of the electrodes of the gas discharge lamp can be detected or determined taking account of the position data. The pivoting signals can be provided for example by an external luminaire control, but if appropriate also by a luminaire-side input unit.

Furthermore, it is proposed that providing the ripple current is limited to a predefined proportional time period of an average lifetime, in particular of the gas discharge lamp. This configuration makes use of the insight that the application of the ripple current can adversely affect the lifetime of the gas discharge lamp. In this case provision can be made for the ripple current to be provided only for part of the time period of the average lifetime for the intended function of the gas discharge lamp. What can thereby be achieved, for example, is that the effect of the ripple current on the average lifetime of the gas discharge lamp is reduced, such that a practical lifetime of the gas discharge lamp can be achieved even with use of the ripple current. What can be achieved on the other hand is that the permanent deactivation of the ripple current provides a message which indicates to a user that a significant proportion of the lifetime of the gas discharge lamp has already elapsed. By way of example, said proportion can be approximately 50% of the average lifetime, e.g. approximately 70% of the average lifetime, e.g. approximately 85% of the average lifetime.

It may be provided that the ripple current is automatically ended after a predefined first time span has elapsed. This configuration makes use of the effect that the ripple current is provided only for the predefined first time span. The predefined first time span can be for example a few minutes, but also approximately half an hour or approximately a whole hour. The predefined first time span can also be adjustable, of course, in order that the operation of the gas discharge lamp can be expediently adapted to individual requirements. After the predefined first time span has elapsed, the flicker that is then possibly reestablished is accepted. Depending on the application, however, it can also be provided that the predefined first time span is adapted to envisaged operation of the gas discharge lamp and takes account of the fact that the gas discharge lamp is set in a varied manner with regard to its orientation at specific points in time. As a result, the spatial alignment of the electrode arrangement also changes, which, for example in the case of pivoting of the gas discharge lamp in such a way that the electrodes are aligned into a vertical plane, has the effect that the ripple current need not be necessary anymore anyway.

Furthermore, it is proposed that providing the ripple current is automatically activated again after a predefined second time span has elapsed. In various embodiments, the second time span directly follows the elapsing of the first time span. As a result, a clocking of the ripple current can be achieved, which can be chosen for example in a manner adapted to physical properties of the gas.

In various embodiments, this configuration uses a time constant of the gas, which represents a measure in respect of after what time after the ripple current has been switched off significant flicker occurs again. In various embodiments, the predefined second time span is chosen in such a way that the ripple current is activated again before significant flicker occurs. Here, too, empirical measurement data can be consulted in order to adapt the method implementation, in particular regarding the time spans to be chosen. Of course, it can also be provided that not only the first but also the second time span can be varied, for example if the properties of the gas vary accordingly. For this purpose, the first and second time spans can be chosen to be identical or else different from one another in a suitable way. The first and second time spans can be a few milliseconds, for example. By way of example, a range for the first and/or the second time span of approximately 1 ms to approximately 100 ms can be provided, depending on the respective gas and, if appropriate, further e.g. mechanical properties such as an electrode spacing and/or, in relation to a discharge vessel, a length, a cross section, e.g. with respect to a cross-sectional shape or dimensions of the cross section and/or the like.

Furthermore, it is proposed that a total time of providing the ripple current is detected and providing the ripple current is permanently deactivated upon the total time exceeding a comparison value. The total time may relate to the entire operating duration of the gas discharge lamp. The comparison value relates to the entire operating duration provided and may be a predefined proportion thereof. This configuration affords the effect that after the elapsing of a total time of providing the ripple current, said total time being determined by the comparison value, ripple current is not applied to the gas discharge lamp anymore. Although this then has the effect that flicker occurs again, this has the effect that, as a result of the permanent deactivation of the ripple current, the lifetime of the gas discharge lamp is not adversely affected further by the ripple current. Furthermore, provision can be made for the total time for providing the ripple current to be used to predefine the comparison value. In this regard, by way of example, it can be provided that, with greater total time, the comparison value is likewise chosen to be greater. In this regard, in one configuration, provision can be made for predefining the comparison value at the beginning of a start-up of the gas discharge lamp at 5 hours for a time period of 20 hours. Afterward, it is possible to increase the comparison value for a predefined supplementary time period, for example a further 20 hours, for example to 6 hours or the like.

The ballasts have an electronic circuit arrangement which allows electrical energy to be applied to the electrodes of the gas discharge lamp in a predefined manner, e.g. in accordance with the method implementation according to various embodiments. For this purpose, the respective ballast is connected to an electrical energy source, which can be for example an electrical energy store such as a rechargeable battery or the like or else an energy supply system, for example the public energy supply system or the like. In various embodiments, besides electronic components, the electronic circuit also includes a program-controlled computer unit designed to realize a function predefined by a computer program, such that the ballast can provide the desired function. For this purpose, the computer unit may include a memory unit or be connected to a memory unit in which the computer program is stored in the form of digital data. In various embodiments, the computer unit can be formed by a semiconductor chip provided as an electronic component in the electronic circuit.

It is furthermore proposed that the luminaire includes a position sensor, which is connected to the ballast and is designed to determine an orientation of the discharge vessel in space and to provide a corresponding orientation signal, wherein the ballast is designed to provide a ripple current depending on the orientation signal. This configuration takes account of the fact that the flicker of the halo does not occur for every orientation of the discharge vessel in space. In this regard, it has been found, for example that flicker occurs particularly when the electrodes of the gas discharge lamp are arranged in a substantially horizontal plane. By contrast, if the electrodes are arranged in a substantially vertical plane, hardly any or no flicker at all occurs. In the case of such an orientation of the discharge vessel, therefore, no ripple current need be provided. Furthermore, there is the possibility, of course, of setting an amplitude of the ripple current depending on a pivoting angle of the plane in which the electrodes are arranged. As a result, it is possible to reduce impairments of the electrodes as a result of the application of the ripple current.

Furthermore, it is proposed that the luminaire includes an evaluation unit, which is connected to the ballast and is designed to provide an evaluation signal, wherein the ballast is designed to provide the ripple current depending on the evaluation signal. This configuration takes account of possible effects of provided settings of the luminaire with respect to the flicker of the halo. In this case, effects such as, for example, graphical optical black out (GOBO), movements of the luminaire, set luminous effects such as, for example, frosting, prism effects, dynamic effects or the like, diaphragm settings, zoom settings and/or the like can be taken into account. The flicker can be of or occur with varying degrees of relevance, e.g. disturbance, in the case of the settings mentioned above. This can be taken into account by means of the evaluation signal. The ballast can provide for the activation of the ripple current and e.g. also its amplitude depending on the evaluation signal. By way of example, the settings mentioned above can be taken into account cumulatively in the evaluation signal. Furthermore, it is also possible, of course, to take account of weighting factors for at least individual settings from among said settings.

The effects can be generated by suitable optically effective elements that can be moved as required into the emitted light. The optically effective elements can be color filters, transparent or translucent or light-scattering sheets, prisms, lenses, mirrors and/or the like. Preferably, said optically effective elements can themselves also in turn be embodied in an adjustable fashion. Such elements are disclosed for example in US 2014/0111999 A1, wherein a plurality of movable filter and effect light wheels are provided in order to be able to set a multiplicity of light effects in the case of a gas discharge lamp as light source. Furthermore, US 2010/0246184 A1 discloses an effect light wheel, wherein individual filter or effect light elements can be arranged in a wheel, wherein the effect light wheel is arranged in a manner rotatable about its own axis. Such a filter or effect light element can have for example a prism-like surface, a multifaceted surface or a surface embodied in a suchlike manner.

The effects and advantages indicated for the methods according to the invention likewise apply, of course, to the correspondingly designed ballasts which are designed to realize the methods of the various embodiments, and vice versa. This likewise applies to the luminaire embodied with such ballasts.

LIST OF REFERENCE SIGNS

1 Reflector
2 Diaphragm
3 Diffusor sheet
4 Lens arrangement
5 Light
6 Gas discharge lamp
7 Discharge vessel
8 Electrode
9 Electrode
10 Luminaire
11 Ballast
12 Energy source
13 Line
14 Line
15 Step-down converter
16 Arc discharge
17 Electrode current
18 Ripple current
19 Storage inductor
20 Gas
21 Graph
22 Region
23 Abscissa
24 Ordinate
25 Abscissa
26 Ordinate
27 Beam
28 Straight line
29 Operating range
30 Non-intermittent operation
31 Limitation
32 Luminaire housing
33 Clip
34 Securing plate
35 Pivoting axis
36 Pivoting axis
37 Abscissa
38 Ordinate
39 Process
40 Process
41 Process
42 Process
43 Process
44 Process
45 Process
46 Process
47 Process
48 Process
49 Process
50 Process
51 Process
52 Method sequence
53 Beam
54 Bridge inverter
55 Ignition stage
56 Control unit
57 Communication interface
$U_{min}$ Minimum voltage
$T_1$ to $T_6$ Points in time
$R_M$, $R_G$, $R_E$, $R_B$, $R_0$ Evaluation parameters
$R_{crit}$ Comparison value
$\Sigma R_x$ Value
$\varphi$ Angle
$\vartheta$ Angle
$\vartheta_{max}$ Maximum angle
n no
y yes
$f_R$ Ripple current frequency While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A method for operating a ballast for a gas discharge lamp, the gas discharge lamp comprising:
   at least two electrodes arranged in a manner spaced apart with a predefined spacing in a transparent discharge vessel filled with a gas;
   the method comprising:
   applying electrical energy to the electrodes by means of the ballast in such a way that an arc discharge occurs between the electrodes, for which purpose the ballast provides an electrical electrode current by a step-down converter of the ballast, said electrode current comprising, a ripple current, wherein a ripple current frequency is dependent on an operating frequency of the step-down converter, wherein the operating frequency is dependent on a charging time period and a discharging time period for an electrical energy store of the step-down converter, wherein the operating frequency is chosen in such a way that the ripple current in a region of the arc discharge brings about a resonant excitation of the gas enclosed in the transparent discharge vessel;
   providing an additional pause time period between a respective one of a discharging time period and a respectively succeeding charging time period, wherein the time duration of the additional pause time period is chosen in such a way that a sum formed from the discharging time period, the succeeding charging time period and the additional pause time period provided therebetween, attains the period duration corresponding to the operating frequency; and
   determining a mechanical resonance of the gas in the region of the arc discharge and setting the operating frequency by setting the additional pause time period depending on the determined mechanical resonance.

2. The method of claim 1,
wherein the additional pause time period is varied within a predefined time interval.

3. The method of claim 1,
wherein a first predefined value is formed by at least one of a first frequency or a first amplitude of the ripple current or a second predefined value is formed by a second frequency or a second amplitude of the ripple current.

4. The method of claim 1,
further comprising detecting a spatial alignment of the electrodes of the gas discharge lamp and providing the ripple current depending on the spatial alignment.

5. A method for operating a ballast for a gas discharge lamp, the gas discharge lamp comprising:
at least two electrodes arranged in a manner spaced apart with a predefined spacing in a transparent discharge vessel filled with a gas;
the method comprising:
applying electrical energy to the electrodes by the ballast in such a way that an arc discharge occurs between the electrodes, for which purpose the ballast provides an electrical electrode current, said electrode current comprising a ripple current, wherein a ripple current frequency is chosen in such a way that the ripple current in a region of the arc discharge brings about a resonant excitation of the gas enclosed in the transparent discharge vessel;
detecting a spatial alignment of the electrodes of the gas discharge lamp and providing the ripple current depending on the spatial alignment; and
at least one operating parameter of the ripple current assuming a first predefined value in a first time period and a second predefined value in a second time period, which is different than the first time period.

6. The method of claim 5,
wherein the first predefined value is formed by at least one of a first frequency or a first amplitude of the ripple current or the second predefined value is formed by a second frequency or a second amplitude of the ripple current.

7. The method of claim 5,
wherein providing the ripple current is limited to a predefined proportional time period of a lifetime of the ripple current.

8. The method of claim 5,
wherein providing the ripple current is automatically ended after a predefined first time span has elapsed.

9. The method of claim 8,
wherein providing the ripple current is automatically activated again after a predefined second time span has elapsed.

10. The method of claim 5,
wherein a total time of providing the ripple current is detected and providing the ripple current is permanently deactivated upon the total time exceeding a comparison value.

11. A ballast for a gas discharge lamp, comprising:
at least two electrodes arranged in a manner spaced apart with a predefined spacing in a transparent discharge vessel filled with a gas,
a step-down converter configured to apply electrical energy to the electrodes, such that an arc discharge occurs between the electrodes, for which purpose the step-down converter is designed to provide an electrical electrode current comprising a ripple current having a ripple current frequency dependent on an operating frequency of the step-down converter, which is dependent on a charging time period and a discharging time period for an electrical energy store of the step-down converter, wherein the step-down converter is furthermore designed to set the operating frequency in such a way that the ripple current in a region of the arc discharge brings about a resonant excitation of the gas enclosed in the transparent discharge vessel;
wherein a spatial alignment of the electrodes in the gas discharge lamp is determined and the ripple current is based on the determined spatial alignment;
wherein the step-down converter is furthermore designed to provide an additional pause time period between a respective one of a discharging time period and a respectively succeeding charging time period, wherein the time duration of the additional pause time period is chosen in such a way that a sum formed from the discharging time period, the succeeding charging time period and the additional pause time period provided therebetween, attains the period duration corresponding to the operating frequency.

12. A ballast for a gas discharge lamp, comprising:
at least two electrodes arranged in a manner spaced apart with a predefined spacing in a transparent discharge vessel filled with a gas, wherein the ballast is designed to apply electrical energy to the electrodes in such a way that an arc discharge occurs between the electrodes, for which purpose the ballast provides an electrical electrode current comprising a ripple current, wherein a ripple current frequency is chosen in such a way that the ripple current in a region of the arc discharge brings about a resonant excitation of the gas enclosed in the transparent discharge vessel;
wherein a spatial alignment of the electrodes in the gas discharge lamp is determined and the ripple current is based on the determined spatial alignment; and
wherein the ballast is designed such that at least one operating parameter of the ripple current assumes a first predefined value in a first time period and a second predefined value in a second time period, which is different than the first time period.

13. A luminaire, comprising:
a gas discharge lamp having at least two electrodes arranged in a manner spaced apart with a predefined spacing in a transparent discharge vessel filled with a gas; and
a ballast, comprising:
a step-down converter configured to apply electrical energy to the electrodes, such that an arc discharge occurs between the electrodes, for which purpose the step-down converter is designed to provide an electrical electrode current comprising a ripple current having a ripple current frequency dependent on an operating frequency of the step-down converter, which is dependent on a charging time period and a discharging time period for an electrical energy store of the step-down converter, wherein the step-down converter is furthermore designed to set the operating frequency in such a way that the ripple current in a region of the arc discharge brings about a resonant excitation of the gas enclosed in the transparent discharge vessel;
wherein a spatial alignment of the electrodes in the gas discharge lamp is determined and the ripple current is based on the determined spatial alignment; and
wherein the step-down converter is furthermore designed to provide an additional pause time period between a respective one of a discharging time period and a respectively succeeding charging time period, wherein the time duration of the additional pause time period is chosen in such a way that a sum formed from the discharging time period, the succeeding charging time period and the additional pause time period provided therebetween, attains the period duration corresponding to the operating frequency.

14. The luminaire of claim 13, wherein:
an orientation of the discharge vessel in space is determined and the determined orientation is provided to the ballast, wherein the ballast is designed to provide the ripple current depending on the determined orientation.

15. The luminaire of claim 13, wherein:
an evaluation signal is provided to the ballast, wherein the ballast is designed to provide the ripple current depending on the evaluation signal.

16. A luminaire, comprising:
a gas discharge lamp having at least two electrodes arranged in a manner spaced apart with a predefined spacing in a transparent discharge vessel filled with a gas; and
a ballast designed to apply electrical energy to the electrodes in such a way that an arc discharge occurs between the electrodes, for which purpose the ballast provides an electrical electrode current comprising a ripple current, wherein a ripple current frequency is chosen in such a way that the ripple current in a region of the arc discharge brings about a resonant excitation of the gas enclosed in the transparent discharge vessel;
wherein a spatial alignment of the electrodes in the gas discharge lamp is determined and the ripple current is based on the determined spatial alignment; and
wherein the ballast is designed such that at least one operating parameter of the ripple current assumes a first predefined value in a first time period and a second predefined value in a second time period, which is different than the first time period.

17. The luminaire of claim 16, wherein:
an orientation of the discharge vessel in space is determined and the determined orientation is provided to the ballast, wherein the ballast is designed to provide the ripple current depending on the determined orientation.

18. The luminaire of claim 16, wherein:
an evaluation signal is provided to the ballast, wherein the ballast is designed to provide the ripple current depending on the evaluation signal.

* * * * *